United States Patent [19]

Costes

[11] 3,953,289

[45] Apr. 27, 1976

[54] DEVICE FOR SUPPORTING A NUCLEAR REACTOR CORE

[75] Inventor: Didier Costes, Paris, France

[73] Assignee: Commissariat a l'Energie Atomique, Paris, France

[22] Filed: Jan. 18, 1974

[21] Appl. No.: 434,696

[30] Foreign Application Priority Data
Jan. 23, 1973 France .......................... 73.02249

[52] U.S. Cl. .................................. 176/87; 176/50; 176/61
[51] Int. Cl.² ........................................ G21C 15/12
[58] Field of Search .................. 176/87, 65, 50, 61

[56] References Cited
UNITED STATES PATENTS

| | | | |
|---|---|---|---|
| 2,997,435 | 8/1961 | Millar et al. | 176/87 |
| 3,711,371 | 1/1973 | Cahill, Jr. | 176/87 |

Primary Examiner—Verlin R. Pendegrass
Assistant Examiner—C. T. Jordan
Attorney, Agent, or Firm—Cameron, Kerkam, Sutton, Stowell & Stowell

[57] ABSTRACT

The core of a light-water reactor which is enclosed in a prestressed concrete pressure vessel and held within a diffuser basket is supported by a device consisting of a cylindrical shell which surrounds the basket and is rigidly fixed to a plurality of frusto-conical skirts having concurrent axes and located substantially at right angles to the axis of the reactor core. The small base of each skirt is rigidly fixed to the shell and the large base is anchored in openings formed in the reactor vessel for the penetration of coolant inlet and outlet pipes. The top portion of the shell is secured to the top portion of the diffuser basket, a flat surface being formed on the shell at the point of connection with each frusto-conical skirt so as to ensure rigid suspension while permitting of thermal expansion.

8 Claims, 4 Drawing Figures

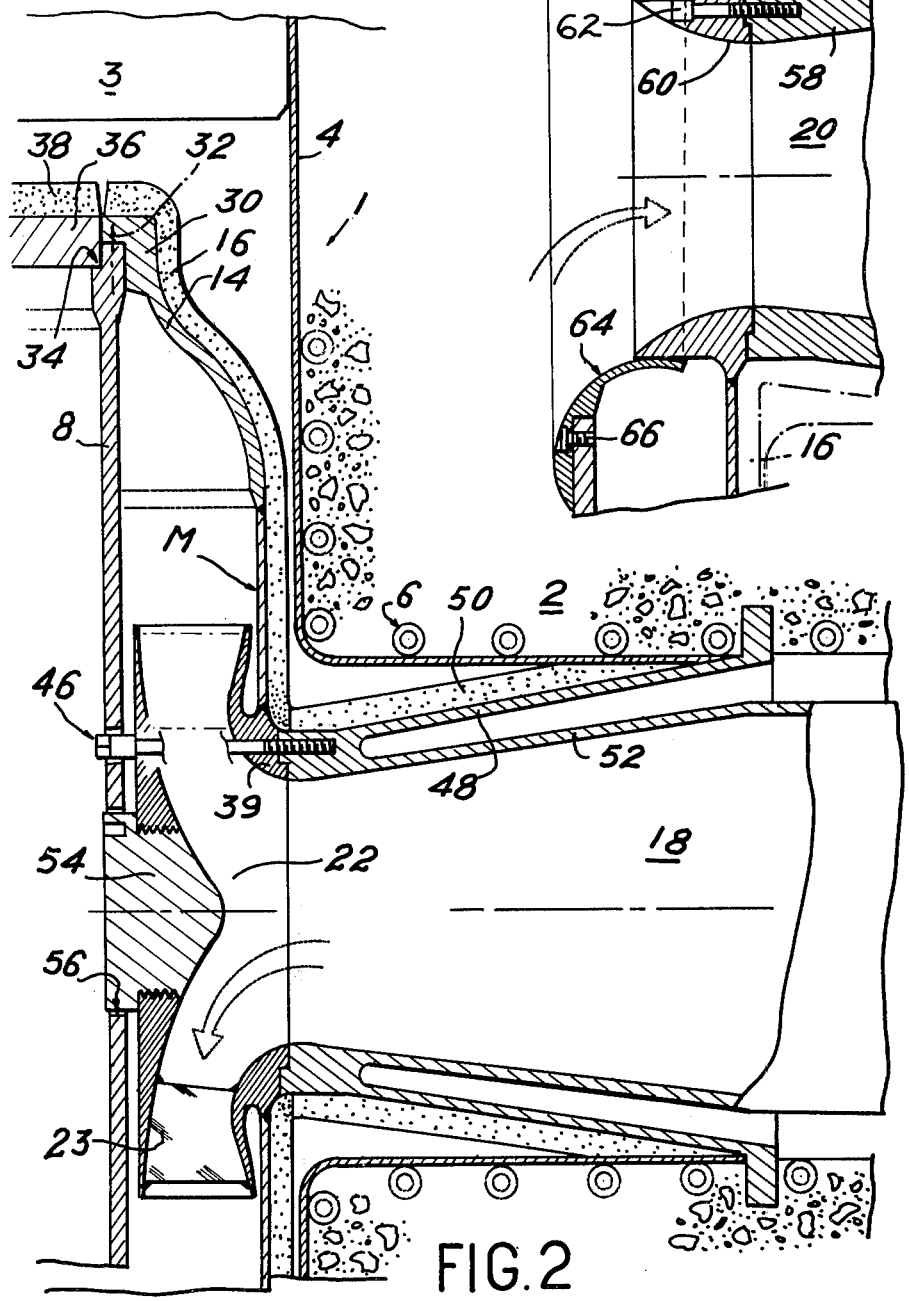
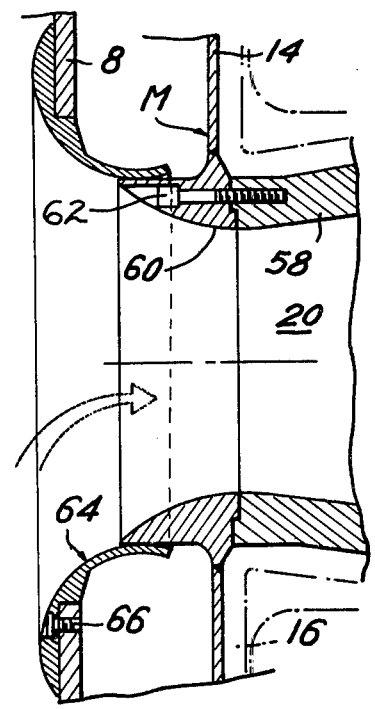
FIG.2
FIG.3

DEVICE FOR SUPPORTING A NUCLEAR REACTOR CORE

This invention relates to a device for supporting the core containment tank of a nuclear reactor which is enclosed in a prestressed concrete pressure vessel, the reactor core being maintained within a basket formed by a shell and bottom wall pierced by holes through which the coolant circulates.

In more precise terms, the invention is concerned with internal structures for supporting the core of a nuclear reactor which is cooled and moderated by pressurized light water within a prestressed concrete pressure vessel. The primary water is admitted into the pressure vessel at a temperature of the order of 290°C and discharged from said vessel at 325°C at a normal pressure of 155 bars. The concrete mass of the pressure vessel is maintained at 50°C. The internal structures which support the reactor core must be capable of expanding with respect to the pressure vessel while being suitably maintained with appropriate sealing means with respect to the different piping systems which pass through the cold wall. Consideration will be given in particular to the case of heat insulation by means of stagnant fluid under pressure between the concrete and the primary water, said insulation being placed between the cold wall and an internal hot jacket which supports the reactor core. Said jacket comprises a vertical shell to which are connected the nozzles for large horizontal water piping, provision being essentially made for sealing means, especially when the fluid which impregnates the heat insulation is a gas which must be prevented from mixing with the water.

As is already known, a large number of means for supporting a nuclear reactor core are already in existence and among these can be mentioned:

supporting by means of tie-rods rigidly fixed to the basket of the reactor and to the seal plug which closes the concrete reactor vessel;

supporting on the bottom of the reactor vessel by means of a floor which is anchored to the bottom wall and on which the structures of the reactor core are carried;

supporting by means of a cylindrical shell, the top flange of which rests on a corbel of the reactor vessel.

All the solutions mentioned above suffer from a disadvantage in that they either call for the use of non-functional components (such as tie-rods, shells or barrels) or set problems which are difficult to solve in regard to leak-tightness between the core structures and the piping systems for transporting the primary coolant.

The precise aim of the present invention is to provide a device for supporting the basket of a nuclear reactor core which overcomes the disadvantages referred-to in the foregoing.

The device is characterized in that it is constituted by a cylindrical shell having a plurality of flat surfaces in which the normals to the centers of said surfaces are approximately concurrent and that each flat surface is rigidly connected at its center to the reactor vessel and at its periphery to the reactor core structure.

In a preferred embodiment, the rigid connections with the reactor vessel are constituted by a plurality of frusto-conical skirts having concurrent axes and substantially perpendicular to the axis of the reactor core, the small base of each skirt being rigidly fixed to one of the central zones of the flat surfaces of said shell and the large base being anchored in the reactor vessel.

In accordance with the present invention, a hot system under pressure such as the core of a nuclear reactor is enclosed within a cooled pressure-resistant vessel, an internal hot jacket being so arranged as to define with the pressure vessel an intermediate space lined with heat-insulating material impregnated with a fluid which is substantially at the pressure of the internal system. Said jacket is provided with a series of flat surfaces of sheet metal having a relatively small thickness, certain zones of said flat surfaces being secured to the cold wall by means of rigid projecting members which are embedded in said wall and in which the temperature difference is established. Said projecting members are designed especially in the form of conical skirts enclosing the hot piping for connecting the internal device to external circulation systems.

At the time of variations in internal temperature which give rise to expansions, the flat surfaces are deformed by bending either inwards or outwards while ensuring a high degree of rigidity in the direction of the planes of said surfaces. Considered as a whole, the flat surfaces are therefore capable of ensuring rigid suspension while at the same time permitting thermal expansion processes.

For the sake of compatibility of deformations, the normals to the flat surfaces which pass through the centers of the holding zones are substantially concurrent.

A clearer understanding of the invention will in any case be obtained by consideration of the following description of one embodiment of the device which is given by way of non-limitative example, reference being made to the accompanying drawings wherein:

FIG. 2 is a detail view of the supporting device taken along the section plane of FIG. 1;

FIG. 3 is a fragmentary sectional view taken along the plane C—C of FIG. 4 and showing a duct for the discharge of primary fluid;

Figure 1:
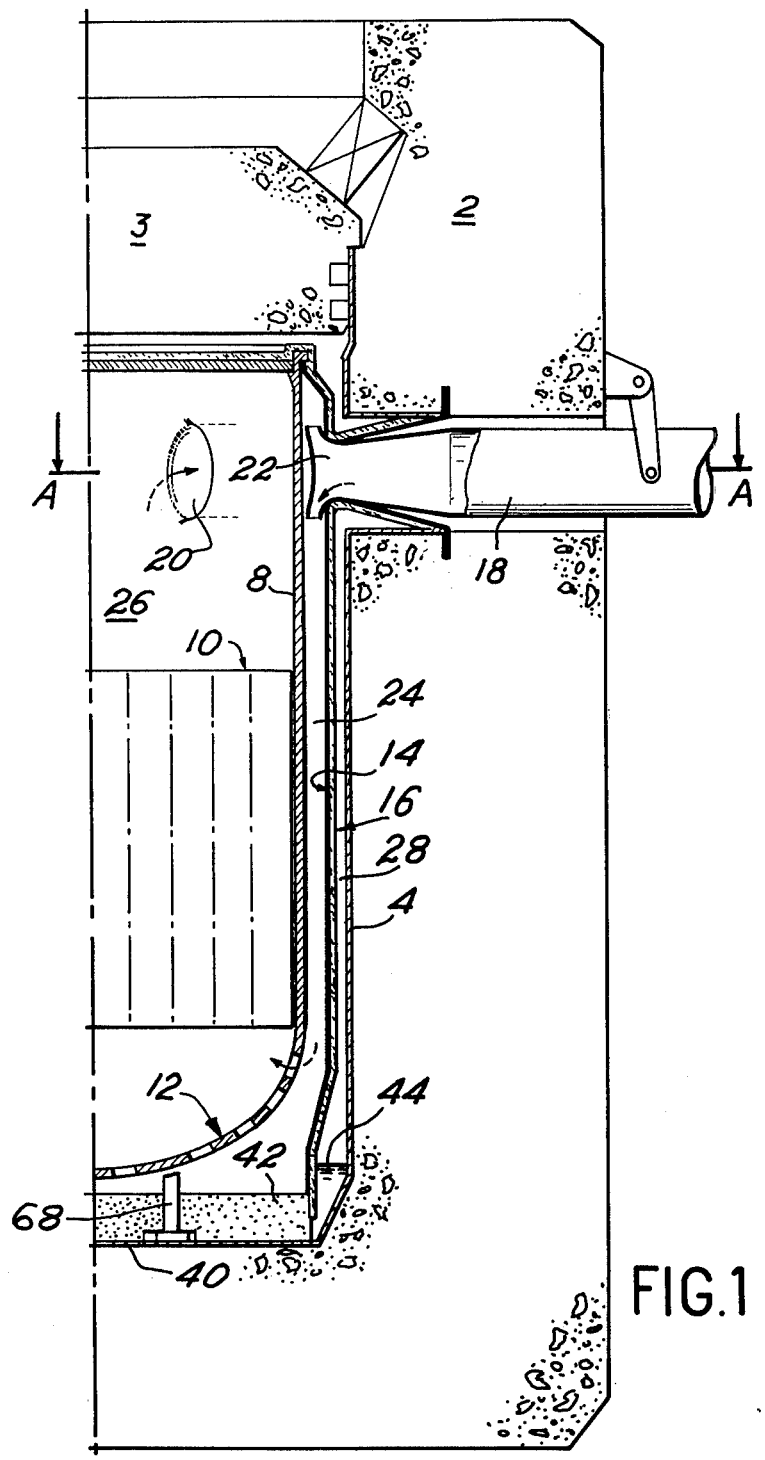
FIG. 1 is a sectional half-view of the reactor taken along the vertical plane B-B of FIG. 4.
Figure 4:
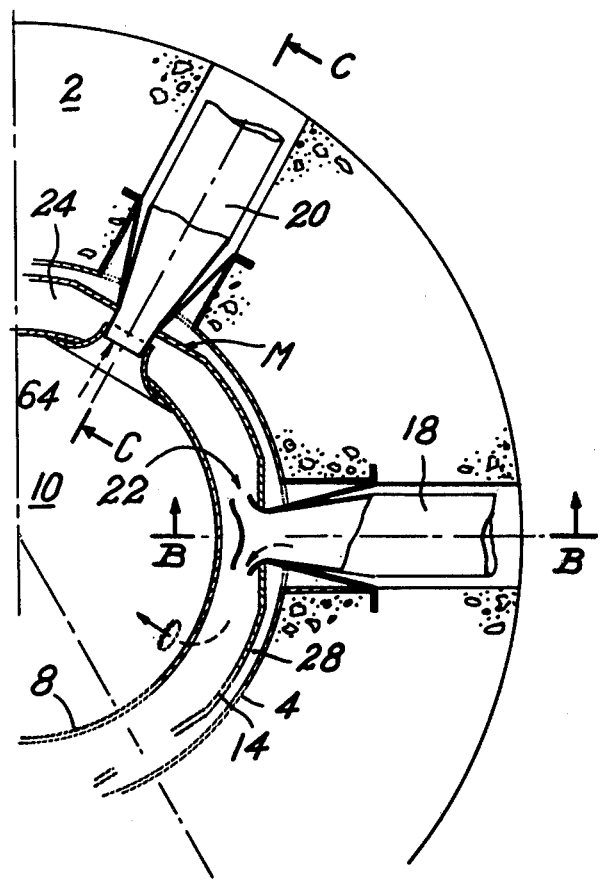
FIG. 4 is a half-view of the reactor taken along the section plane A—A of FIG. 1.

In FIG. 1, the prestressed concrete pressure vessel 2 which is closed by the seal plug 3 is fitted with a leak-tight lining membrane 4 (cooled externally by means of cold-water coils 6). The pressure vessel contains an internal structure consisting of two concentric and substantially cylindrical vertical shells, namely an inner shell 8 which surrounds the nuclear reactor core 10 and serves to support this latter and an outer shell 14 which is connected at the top end to said inner shell and is covered externally with heat insulation 16 in very close proximity to the lining membrane 4.

By way of example, the reactor is provided with six large pipes for the circulation of primary coolant water. Said pipes are convergent in a same plane A—A. Provision is made for three inlet pipes such as the pipe 18 and three outlet pipes such as the pipe 20. The pipes 18 open through a diffuser 22 into the annular space 24 which is limited by the shells 8 and 14. The diffuser 22 is provided with radial fins 23. The pipes 20 open through the shell 8 into the reactor vessel 26 above the core 10.

In the zone of connection of each pipe 18 or 20, the shell 14 is provided with a flat surface such as the surface designated by the reference M. To this end, said shell has a generally hexagonal cross-section with rounded edges.

The leak-tight lining membrane 4 has the same shape in order to limit the space 28 between the two walls aforesaid. The space 28 which has a very small thickness has been enlarged in FIG. 1 for the sake of enhanced clarity.

The shells 8 and 14 are maintained in rigidly fixed relation at the top ends thereof, for example by attaching the flange 30 of the shell 14 to the top edge of the shell 8 by means of screws as designated by the reference 32. This assembly serves as a seating 34 for the detachable lid 36 of the reactor basket 26. The lid 36 is covered with insulating material 38. The lid 36 and the shell 8 define an "insulating bell". The space 28 which surrounds the bell is filled with gas in hydrostatic equilibrium with the primary water, the separation level being located at the base. The bottom end-wall 40 of the reactor is lined with horizontally stratified and water-impregnated porous material 42, the cold bottom portion of which communicates with the base of the hydraulic seal which is thus formed. In the event of variations in pressure, the water level 44 can vary, the stratification of the material 42 being intended to prevent thermal shocks by transfer of cold water towards a hot wall and conversely.

In FIG. 2, there is shown in detail the method adopted for connecting the shell 14 to a fluid supply pipe 18. The flange 39 of the shell 14 is screwed by means of the nuts 46 onto the small base of the frusto-conical skirt 48. The large base of the skirt 48 is anchored in the concrete of the pressure vessel 2. Said skirt 48 is also covered with heat-insulating material 50. The pipe 18 terminates in a cone 52 which is joined to the small base of the skirt 48. The diffuser 22 is fitted with a seal plug 54 which is screwed into the shell 14 and penetrates into the opening 56 of the shell 8 with allowance for a clearance-space.

The skirt 48 serves both as a mechanical support for the reactor core 10 and as a thermal bridge.

In FIG. 3, there is shown the method adopted for connecting the pipes 20 for the discharge of primary liquid to the shell 14. The wall 58 of the pipe 20 is screwed onto the flange 60 of the shell 14 in leak-tight manner by means of screws such as 62. The flange 60 is engaged with a small clearance within a horn 64 which is in turn screwed onto the shell 8 by means of the screws 66. This permits of relative radial displacement with small leakages of the inlet water towards the outlet water. In the event of a major accident condition, the bottom wall 12 of the shell 8 is permitted to bear on support columns 68 which are fixed in the bottom end-wall 40 of the pressure vessel, with the result that the reactor core 10 is prevented from falling.

The entire reactor core assembly is supported at the level of the pipe connections on the shells 8 and 14, the flat portions M of the shell 14 which surround said pipe-connections being capable of undergoing radial deformations without excessive stresses. Postulating by way of example that the deformed portions are equivalent to annular plates having an internal diameter of 700 mm and an external diameter of 1500 mm with a thickness of 7 mm, a deformation of ± 6 mm corresponding to the thermal expansion is obtained with maximum stresses of the order of 48 kg/mm$^2$. About 5000 cycles can be expected, which is superabundant so far as the lifetime of the reactor is concerned. The thickness of 7 mm is amply sufficient to ensure the holding function but the normal working portion of the shell 14 will nevertheless be provided with a greater thickness in order to afford higher resistance either to normal or accidental pressure differences and to vibrations.

In order to reduce thermal stresses, it is an advantage to reduce the internal diameter of the passage and this entails the need to place within this latter the sonic throat or venturi which is in any case useful for the purpose of limiting the leakage flow which occurs in the event of failure of the external piping. By way of example, the cross-sectional area can be reduced by one-half and a duct having a standard diameter of 720 mm can have a sonic throat with an internal diameter of 500 mm; this corresponds to the basic assumption in which the internal diameter of the flexible flat portion is 700 mm.

Attachment of the shell 14 to the shell 8 makes it possible after disassembly of the plugs 54 and the horns 64 and uncoupling of the flanges 39 and 60 to lift the assembly from the shell 14 either for inspection or renewal without having to lift the shell 8 and the reactor core 10 at the same time.

What we claim is:

1. A device for supporting a reactor core structure of a nuclear reactor, wherein said device is constituted by a cylindrical shell having a plurality of flat surfaces in which the normals to the centers of said surfaces are approximately concurrent and wherein each flat surface is rigidly connected at the center thereof to a reactor vessel and at the periphery thereof to the reactor core structure.

2. A device according to claim 1, wherein the rigid connections with the reactor vessel are constituted by a plurality of frusto-conical skirts having concurrent axes and substantially perpendicular to the axis of the reactor core, the small base of each skirt being rigidly fixed to one of the central zones of the flat surfaces of said shell and the large base being anchored in the reactor vessel.

3. A device according to claim 2, wherein the large base of said frusto-conical skirt is anchored in openings which are formed in the reactor vessel and serve as penetrations for fluid circulation pipes.

4. A device according to claim 1, wherein the structure which serves to support the reactor core is constituted by a cylindrical basket which is rigidly fixed at the top end to said cylindrical shell.

5. A device according to claim 4, wherein said shell has a diameter such as to form annular spaces between said shell and a leak-tight lining membrane of the reactor vessel and between said shell and the cylindrical basket of the reactor core, said annular spaces being intended to communicate with each other through a passage formed between the bottom end-wall of the reactor vessel and the bottom portion of said shell.

6. A device according to claim 5, wherein said shell is provided with a heat-insulating covering on that face which is directed towards the leak-tight lining membrane.

7. A device according to claim 5, wherein the annular space formed between the leak-tight lining membrane and the shell is filled with a gas under pressure which is in hydrostatic equilibrium with a primary liquid with which the space provided within said shell is filled.

8. A device according to claim 7 wherein, in the zone of connection with the shell, the reactor basket is provided with a seating for a basket lid, said lid being covered with heat-insulating material.

* * * * *